United States Patent
Borenstein et al.

(10) Patent No.: US 6,870,343 B2
(45) Date of Patent: Mar. 22, 2005

(54) INTEGRATED, PROPORTIONALLY CONTROLLED, AND NATURALLY COMPLIANT UNIVERSAL JOINT ACTUATOR WITH CONTROLLABLE STIFFNESS

(75) Inventors: Johann Borenstein, Ann Arbor, MI (US); Grzegorz Granosik, Ann Arbor, MI (US)

(73) Assignee: The University of Michigan, Ann Arbor, MI (US)

( * ) Notice: Subject to any disclaimer, the term of this patent is extended or adjusted under 35 U.S.C. 154(b) by 0 days.

(21) Appl. No.: 10/672,290

(22) Filed: Sep. 26, 2003

(65) Prior Publication Data

US 2005/0007055 A1 Jan. 13, 2005

Related U.S. Application Data

(63) Continuation-in-part of application No. 10/318,452, filed on Dec. 12, 2002, now Pat. No. 6,774,597, which is a continuation-in-part of application No. 09/821,867, filed on Mar. 30, 2001, now Pat. No. 6,512,345.

(51) Int. Cl.$^7$ ............................................... B25J 19/02
(52) U.S. Cl. ............. 318/568.16; 318/567; 318/568.12; 901/1; 600/141; 600/146; 180/9.21; 180/9.32
(58) Field of Search ..................... 318/567, 568.12; 318/568.16; 180/8.7, 9.21, 9.32; 901/1; 600/139, 141, 142, 146, 152

(56) References Cited

U.S. PATENT DOCUMENTS

| | | | |
|---|---|---|---|
| 4,527,650 A | | 7/1985 | Bartholet |
| 4,738,583 A | | 4/1988 | Macconochie et al. |
| 4,872,524 A | | 10/1989 | O'Connor |
| 4,932,831 A | | 6/1990 | White et al. |
| 5,145,130 A | | 9/1992 | Purves |
| 5,255,753 A | | 10/1993 | Nishikawa et al. |
| 5,257,669 A | | 11/1993 | Kerley et al. |
| 5,337,732 A | * | 8/1994 | Grundfest et al. .......... 600/116 |
| 5,351,626 A | | 10/1994 | Yanagisawa |
| 5,351,773 A | | 10/1994 | Yanagisawa |
| 5,357,433 A | * | 10/1994 | Takenaka et al. ............. 701/23 |
| 5,363,935 A | | 11/1994 | Schempf et al. |
| 5,423,708 A | | 6/1995 | Allen |
| 5,644,204 A | | 7/1997 | Nagle |
| 5,758,734 A | | 6/1998 | Hong et al. |
| 5,807,011 A | | 9/1998 | Hong et al. |
| 5,810,716 A | * | 9/1998 | Mukherjee et al. ......... 600/146 |
| 5,857,533 A | | 1/1999 | Clewett |
| 6,068,073 A | | 5/2000 | Roston et al. |
| 6,105,695 A | | 8/2000 | Bar-Cohen et al. |
| 6,113,343 A | | 9/2000 | Goldenberg et al. |
| 6,162,171 A | * | 12/2000 | Ng et al. .................... 600/141 |
| 6,178,872 B1 | * | 1/2001 | Schulz .......................... 92/92 |
| 6,484,601 B1 | | 11/2002 | Arrichiello |
| 6,512,345 B2 | | 1/2003 | Borenstein et al. |
| 6,604,427 B1 | * | 8/2003 | Coleman ................... 73/729.1 |

OTHER PUBLICATIONS

"A Safer Way to Search Disaster Sites" by Jennifer Weston, IEEE Robotics & Automation Magazine, Sep. 2000, p. 56–57.

(List continued on next page.)

* cited by examiner

Primary Examiner—Rina Duda
(74) Attorney, Agent, or Firm—Harness, Dickey & Pierce, P.L.C.

(57) ABSTRACT

An apparatus for traversing obstacles having an elongated, round, flexible body that includes a plurality of segments interconnected by an integrated joint actuator assembly. The integrated joint actuator assembly includes a plurality of bellows-type actuators individually coupling adjacent segments to permit pivotal actuation of the apparatus therebetween. A controller is employed to maintain proper positional control and stiffness control while minimize air flow.

16 Claims, 9 Drawing Sheets

OTHER PUBLICATIONS

"Design and Motion Planning of a Mechanical Snake" by Yanson Shan and Yoram Koren, IEEE Transactions on Systems, Man, and Cybernetics, vol. 23, No. 4, Jul./Aug. 1993, p. 1091–1100.

"Design of In–Pipe Inspection Vehicles for >25, >50,>150 Pipes" by Shigeo Hirose, Hidetaka Ohno, Takeo Mitsui, Kijchi Suyama, IEEE International Conference on Robotics & Automation, Detroit, MI May 1999, p. 2309–2314.

"Limbless Locomotion: Learning to Crawl" by Kevin Dowling, IEEE International Conference on Robotics & Automation, Detroit, MI May 1999, p. 3001–3006.

"Limbless Locomotion: Learning to Crawl with a Snake Robot" by Kevin J. Dowling, Advised by William L. Whittaker, Dec. 1997.

"GMD–SNAKE2: A Snake–Like Robot Driven by Wheels and a Method for Motion Control" by Bernhard Klaassen, Karl L. Paap, IEEE International Conference on Robotics & Automation, Detroit, MI May 1999, p. 3014–3019.

"Biomimetic Design and Fabrication of a Hexapedal Running Robot" by Jonathan E. Clark, Jorg G. Cham, Sean A. Bailey, Edward M. Froehlich, Pratik K. Nahata, Robert J. Full, Mark R. Cutkosky, IEEE International Conference on Robotic & Automation, Seoul, Korea, May 21–26, 2001, p. 3643–3649.I.

"Design and Simulation of a Cockroach–Like Hexapod Robot", by G.M. Nelson, R.D. Quinn, R.J. Bachmann, W.C. Flannigan, IEEE International Conference on Robotics and Automation, Albuquerque, New Mexico, Apr. 1997.

"Design and Control of a Mobile Robot With an Articulated Body" by Shigeo Hirose, Akio Morishima, The International Journal of Robotics Research, vol. 9, No. 2, Apr. 1990, p. 99–113.

"Controlling a Multijoint Robot for Autonomous Sewer Inspection" by K.–U. Scholl, V. Kepplin, K. Berns, R. Dillmann, IEEE International Conference on Robotics & Automation, San Francisco, CA Apr. 2000, p. 1701–1706.

"PackBot" Man Portable Tracked Ground Vehicle, iRobot Corporation, http://www.irobot.com/rd/p08_PackBot.asp, Jan. 15, 2003, 4 pages.

"Remotec Andros", Remotec, Inc., http://www.remotec-andros.com/, Jan. 22, 2003, 9 pages.

"Cooperative Robot (Gunryu) Composed of Autonomus Segments," http://mozu.mes.titech.ac.jp/research/colony/gr/gr.html, Jan. 21, 2003, 6 pages.

"Connected Crawler Vehicle for Inspection (Souryu I, II)", http://mozu.mes.titech.ac.jp/research/snake/soryu/index.html, Jan. 21, 2003, 3 pages.

"Millibot Trains for Enhanced Mobility" H. Benjamin Brown, Jr., J. Michael Vande Weghe, Curt A. Bereton, and Pradeep K. Khosla, IEEE/ASME Transactions on Mechatronics, vol. 7, No. 4, Dec. 2002, p. 452–461.

"Development of Mobile Inspection Robot for Rescue Activities: MOIRA" by Koichi Osuka and Hiroshi Kitajima, Proceedings of the 2003 IEEE/RSJ Intl. Conference on Intelligent Robots and Systems, Las Vegas, Nevada, Oct. 2003, p. 3373–3377.

"Modeling, Identification, and Control of a Pneumatically Actuated, Force Controllable Robot" by James E. Bobrow and Brian W. McDonell, IEE Transactions on Robotics and Automation, vol. 14, No. 5, Oct. 1998, p. 732–742.

"Towards High–Speed, Motion Control of Pneumatic Actuators With Low–Cost Valves" by W. Brockmann and J. Kohne, 4th Int. Conference on Climbing and Walking Robots CLAWAR, Karlsruhe, Germany 2001, p. 339–346.

"An Experimental Comparison Between Several Pneumatic Position Control Methods" by S. Chillari, S. Guccione and G. Muscato, Proceedings of the 40th IEEE Conf. on Decision and Control, Orlando, Florida, Dec. 2001, p. 1168–1173.

"A Tele–Operated Semi–Intelligent Climbing Robot For Nuclear Applications" by S. Glat, B.L. Luk, D.S. Cooke and A.A. Collie, Department of Electrical and Electronic Engineering, University of Portsmount, Portsmouth Technology Consultants Ltd, Havant, England, 1997 IEEE, p. 118–123.

"Introduction to Robotics" Addison–Wesley Publishing Company, Inc. 1989, p. 226–235.

"Application of a Maximum Stiffness Rule for Pneumatically Driven Legs of a Walking Robot" by Grzegorz Granosik and Edward Jezierski, Proc. of 2nd Int. Conference on Climbing and Walking Robots, Portsmouth, UK 1999, p.213–218.

"The Selection of Mechanical Actuators Based on Performance Indices" by J.E. Huber, N.A. Fleck and M.F. Ashby, Proc. of the Royal Society of London, Series A. 453, UK 1997, p. 2185–2205.

"Optimization of the Control Parameters of a Pneumatic Servo Cylinder Drive Using Genetic Algorithms" by Yong–Soo Jeon, Chung–Oh Lee, and Ye–Sun Hong, Control Eng. Practice, 1998, vol. 6, p. 847–853.

"A Linear Time Varying Model for On–Off Valve Controlled Pneumatic Actuators" by C. Kunt and R. Singh, Transactions of the ASME, Journal of Dynamic Systems, Measurement and Control, 1990, vol. 112, p. 740–747.

"An Analysis of a Pneumatic Servo System and Its Application to a Computer–Controlled Robot" by S. Liu and J.E. Bobrow, Transactions of the ASME, Journal of Dynamic Systems, Measurement and Control, 1988, vol. 110, p. 228–235.

"Practical Design of a Sliding Mode Controller for Pneumatic Actuators" by S.R. Pandian, Y. Hayakawa, Y. Kanazawa, Y. Kamoyama, S. Kawamura, Transactions of the ASME, Journal of Dynamic Systems, Measurement and Control, 1997, vol. 119, No. 4, p. 666–674.

"Comparison Between Linear and Nonlinear Control of an Electropneumatic Servodrive" by E. Richard and S. Scavarda, Transactions of the ASME, Journal of Dynamic Systems, Measurement and Control, 1996, vol. 118, p. 245–252.

"Study of Pneumatic Processes in the Continuous Control of Motion With Compressed Air I, II," by J.L. Shearer, Transactions of the ASME, Feb. 1956, p. 233–249.

"Position Control of a Pneumatic Rodless Cylinder Using Sliding Mode M–D–PWM Control the High Speed Solenoid Valves" by M.C. Shih and M.A. Ma, JSME International Journal, Series C, 1998, vol. 41, No. 2, p. 236–241.

"Continuous Sliding Mode Control of a Pneumatic Actuator" by B.W. Surgenor and N.D. Vaughan, Transactions of the ASME, Journal of Dynamic Systems, Measurement and Control, Sep. 1997, vol. 119, p. 578–581.

"Accurate Position Control of a Pneumatic Actuator Using On/Off Solenoid Valves" by R.B. vanVarseveld and G.M. Bone, IEEE/ASME Transactions on Mechatronics, 1997, vol. 2, No. 3, p. 195–204.

INTEGRATED, PROPORTIONALLY CONTROLLED, AND NATURALLY COMPLIANT UNIVERSAL JOINT ACTUATOR WITH CONTROLLABLE STIFFNESS

CROSS-REFERENCE TO RELATED APPLICATIONS

This application is a continuation-in-part of U.S. patent application Ser. No. 10,318,452, filed on Dec. 12, 2002, now U.S. Pat. No. 6,774,597, which is a continuation-in-part of Ser. No. 09/821,867, now U.S. Pat. No. 6,512,345, which was filed on Mar. 30, 2001. The disclosures of this application and patent are incorporated herein by reference.

STATEMENT OF GOVERNMENTAL SUPPORT

This invention was made with Government support under Award No. DE-FG04-86NE37969 awarded by the U.S. Department of Energy. The Government has certain rights in this invention.

FIELD OF THE INVENTION

The present invention generally relates to the actuation of joints in mechanical structures and, more particularly, to a pneumatically operated actuation system efficiently integrated in the space occupied by a joint, as well as the simultaneous proportional control of position and stiffness of that joint.

BACKGROUND OF THE INVENTION

Robotic vehicles are often used to navigate or traverse varying terrain. As is well known, wheeled robotic vehicles, both large and small, are particularly well adapted for travel over relatively smooth terrain, such as roads and smooth floors. However, it is often necessary for robots to traverse terrain that is not smooth, such as stairs or curbs. Moreover, it is often necessary for robots to traverse terrain that may pose a danger to humans, such as those situations presenting an environmental risk, military risk, or the like. Often robotic devices are useless in these dangerous situations because of their inability to successfully and reliably traverse any severely broken and/or fractured ground that they may encounter. Attempts have been made to overcome the numerous disadvantages of wheeled robotic vehicles in these situations by simply increasing the diameter of the wheels or adding tank crawler tracks to increase the ability of the robotic device to traverse large objects or spans. However, these solutions include additional disadvantages, such as increasing the overall size of the vehicle, which may inhibit the robot's ability to pass through small openings.

Furthermore, many robots suffer from being rendered immobile as a result of a rollover or other situation that prevents contact of their propulsion member(s) on the ground surface. That is, should a wheeled robot encounter a grade sufficient to roll it on its side, the wheels are no longer capable of propelling the robot. In terrains that pose a risk to humans, such rollovers may render the robot unrecoverable.

Recently, articulating robotic mechanisms, which are also sometimes referred to as snake or serpentine robots, have been developed that successfully overcome the disadvantages of the prior art and navigate such inhospitable environments. Such robots typically employ three or more rigid segments, which are connected through joints. The joints may permit one, two, or more Degrees-of-Freedom (DOF).

Examples of commonly invented robotic mechanisms can be found in U.S. Pat. No. 6,512,345 and U.S. patent application Ser. No. 10/318,452, the disclosures of which are incorporated herein by reference. However, often times prior art robotic devices fail to provide adequate range of motion and/or force necessary to articulate the various robotic segments in demanding environmental situations Accordingly, there exists a need in the relevant art to provide a joint actuator that is capable of providing improved range of motion and/or articulating force. Further, there exists a need in the relevant art to provide an apparatus for traversing obstacles that overcomes the disadvantages of the prior art.

SUMMARY OF THE INVENTION

According to the principles of the present invention, an apparatus for traversing obstacles having an advantageous design is provided. The apparatus includes an elongated, round, flexible body that further includes a plurality of segments interconnected by an integrated joint actuator assembly. The integrated joint actuator assembly includes a plurality of bellows-type actuators individually coupling adjacent segments to permit pivotal actuation of the apparatus therebetween. A controller is employed to maintain proper positional control and stiffness control while minimize airflow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 7(a) and (b) illustrate the spacing requirement between adjacent segments;

FIGS. 9(a) and (b) is a schematic view illustrating the pneumatic circuit of the present invention;

FIGS. 11(a) and (b) are experimental result of a conventional control system (FIG. 11(a)) and the control system of the present invention (FIG. 11(b)).

DETAILED DESCRIPTION OF THE PREFERRED EMBODIMENT

The following description of the preferred embodiment is merely exemplary in nature and is in no way intended to limit the invention, its application, or uses. That is, it should be understood that although the present invention is discussed in connection with robotic devices, the present invention might find utility in a wide variety of applications.

Briefly, by way of background, there are a number of desirable design criteria that ideally would be met in a commercially viable serpentine robot. Serpentine robots are typically relatively long compared to their diameter, so that their lead segments can reach up and over a high step while still being able to fit through small openings. Because of this geometric constraint, as well as other unique characteristics of serpentine robots, the following requirements can be derived (in decreasing order of importance).

It is primarily desirable that a serpentine robot be able to compliantly conform to terrain, such that the maximum number of driving segments are in contact with the ground at any times to provide reliable propulsion. Serpentine robots that do not conform compliantly often require complex sensor systems that measure contact forces and command a momentary angle for each non-compliant joint so as to force contact with the ground. Such actively controlled compliance has not yet been successfully demonstrated, and may well be unfeasible for many years.

Additionally, it is often desirable that the stiffness of a joint may be selectively increased for specific applications, such as crossing a gap or reaching over an obstacle. While other times, it is necessary to adjust carefully the stiffness to an intermediate level, such as when the lead segment leans against a vertical wall while being pushed up that wall by the following segments. Serpentine robots must thus be capable of adjusting the stiffness of every degree of freedom individually and proportionally.

Still further, it is desirable in serpentine robot applications that the joint angles be controllable proportionally to allow "steering" of the front segment with "follow-the-leader" control of all following segments. Additionally, certain motion sequences, such as climbing over a step, require gradual or proportional control of all joint angles.

It is also desirable that any actuators disposed between adjacent segments of the serpentine robot (hereinafter "joint actuators") be capable of developing sufficient force to lift at least two lead segments to the edge of a step in order to climb over it. This requirement is particularly difficult to meet in small-diameter serpentine robots because of the short moment arm available to an actuator applying a force in longitudinal direction.

A further desired feature is that joint actuators take up as little space as possible, because space in a small-diameter serpentine robot is extremely limited.

Finally, it is desirable that energy consumption and weight of the joint actuators be minimized, because energy is a limited resource in an untethered mobile robot. Weight minimization is a related requirement because it translates directly into a reduction in energy consumption.

Prior implementations of serpentine robots did not meet all of these requirements, mainly because no joint actuator existed that would meet these requirements. For that reason, many serpentine robots exist only in the form of research subjects but not as commercially viable products.

There are many different ways of actuating joints in a mechanical structure. However, only a few of them can provide the range of motion and force required to actuate the joints of a serpentine robot. Those actuators include electrical motors, hydraulic motors or actuators, and pneumatic actuators. Of these, only pneumatic actuators are naturally compliant. The present invention recognizes this fact and employs pneumatic actuators. This realization, however, is far from trivial in that no other known serpentine robot employs pneumatic actuators.

Figure 1:
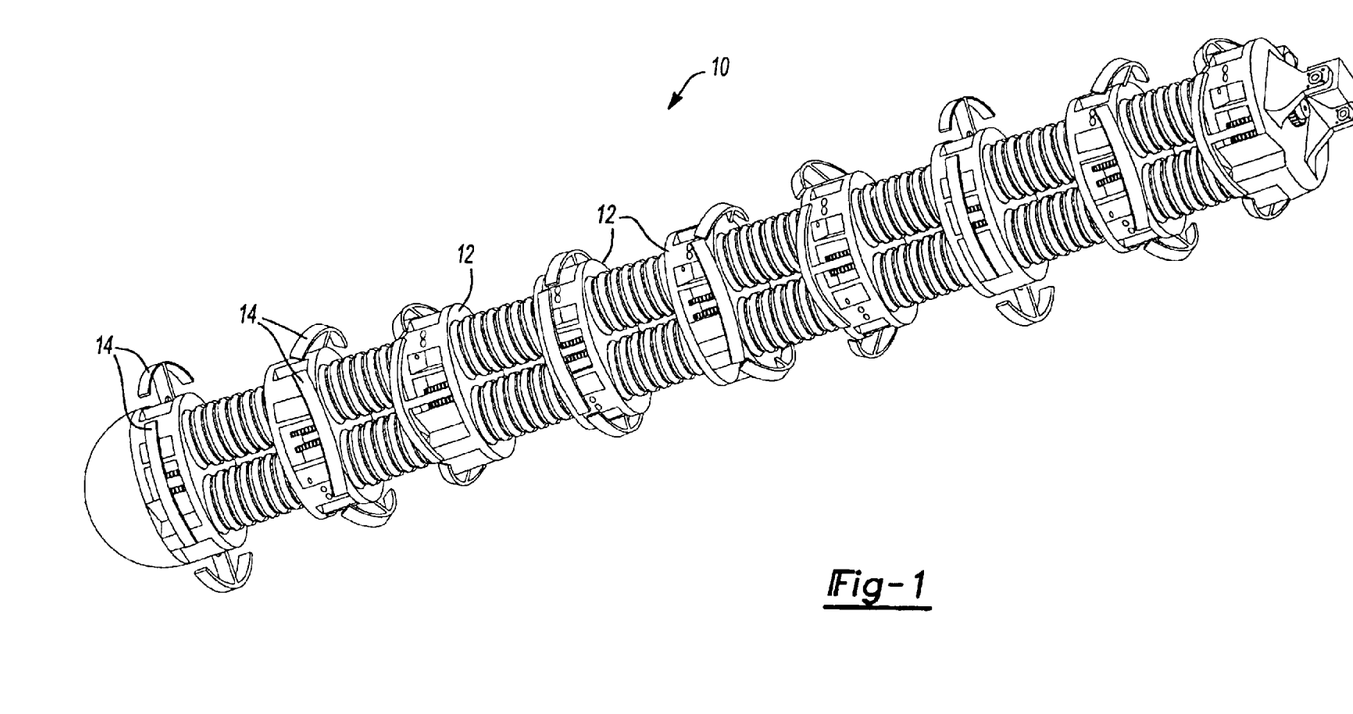
FIG. 1 is a perspective view illustrating an apparatus for traversing obstacles according to a first embodiment of the present invention.
Figure 2:
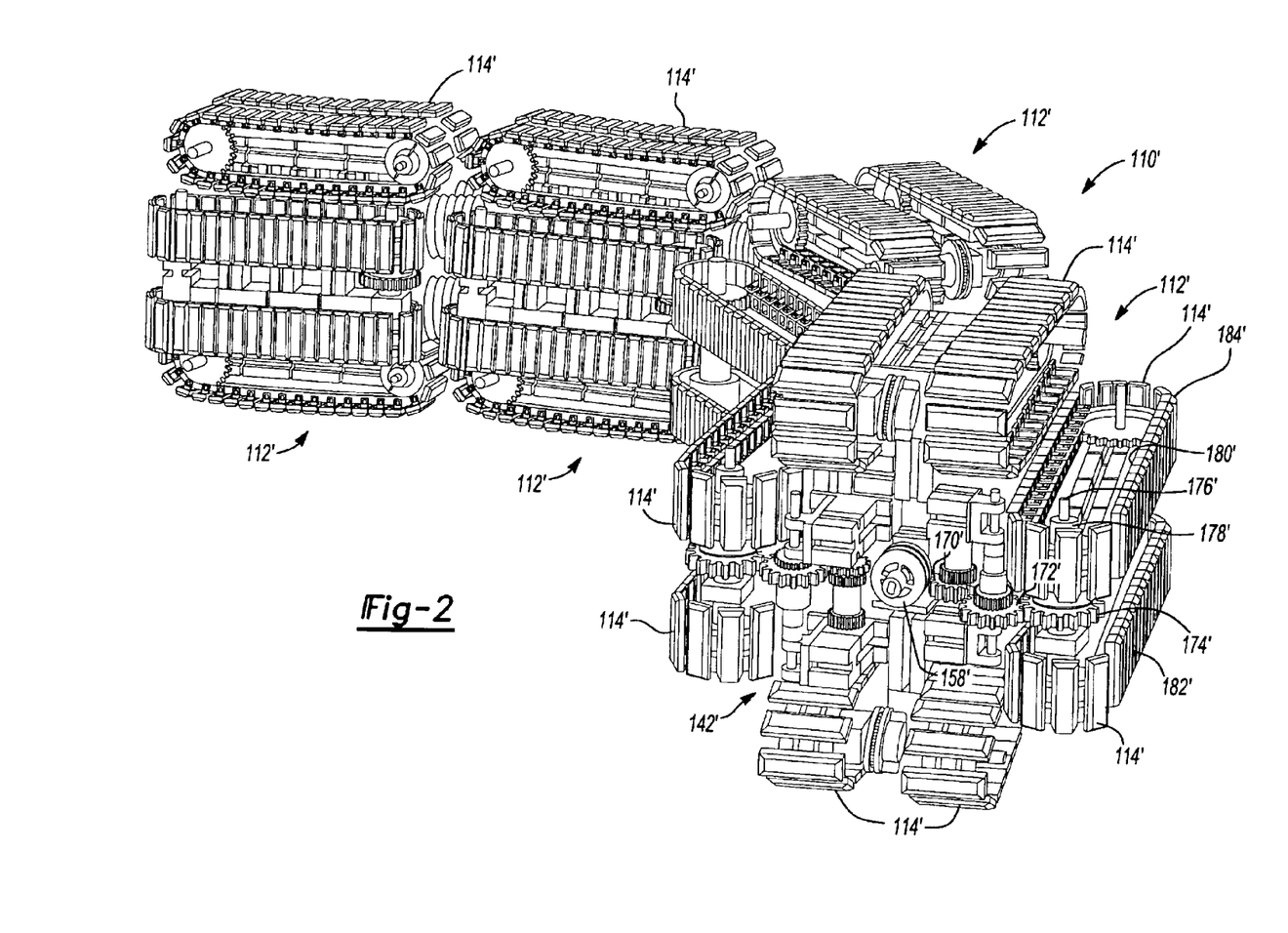
FIG. 2 is a perspective view illustrating an apparatus for traversing obstacles according to a second embodiment of the present invention

Referring now to FIGS. 1 and 2, an integrated joint actuator assembly 100 is illustrated in connection with a first embodiment (FIG. 1), generally indicated at 10, having an elongated, flexible body and a coordinated millipede-type propulsion and a second embodiment (FIG. 2), generally indicated at 10', having an elongated, flexible body, and a drive track propulsion system. The present invention is primarily related to the construction and operation of integrated joint actuator assembly 100 with apparatus 10 and apparatus 10' or the like. It should be appreciated that apparatus 10 and apparatus 10' are similar in construction to those described in detail in U.S. Pat. No. 6,512,345 and U.S. patent application Ser. No. 10/318,452, which were incorporated herein. In the interest of brevity, only those areas in the present invention that differ will be discussed in detail herein.

Figure 3:
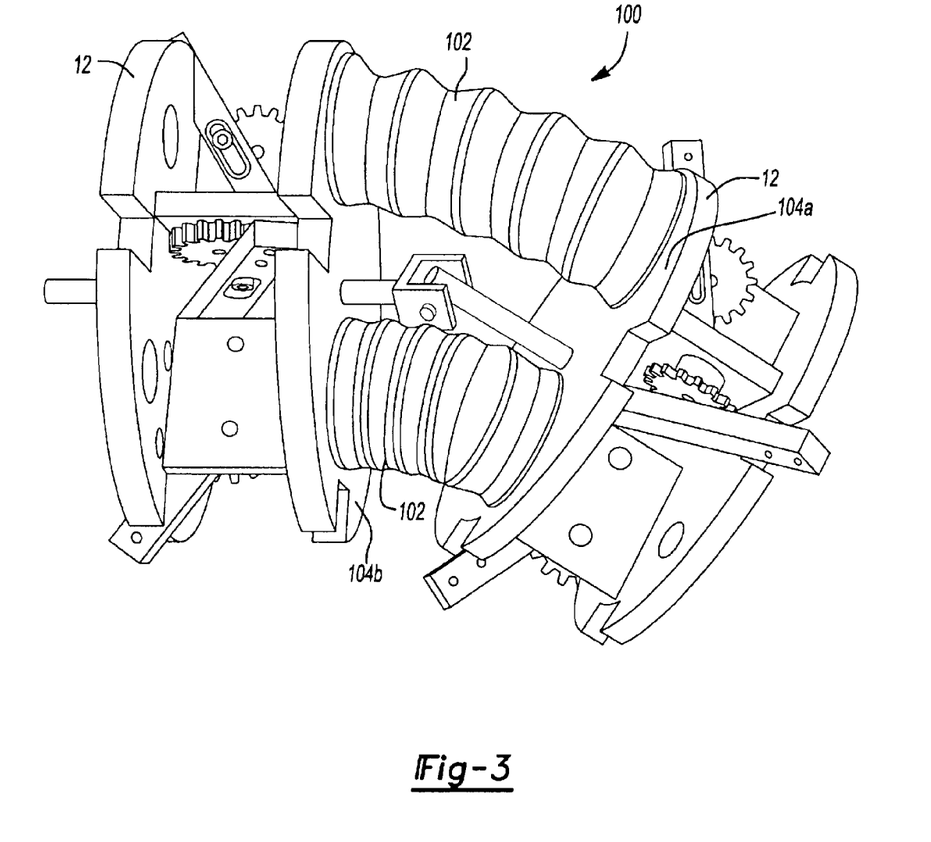
FIG. 3 is an enlarged perspective view illustrating the integrated joint actuator assembly of the present invention.

Referring now to FIGS. 1–3, apparatus 10 and apparatus 10' are provided for traversing obstacles. Each of these apparatuses includes a plurality of identical segments 12, 12'. Each of the plurality of segments 12, 12' includes a plurality of articulating leg mechanisms 14 (FIG. 1) or a plurality of drive track assemblies 14' disposed about the periphery of each segment 12, 12'. The plurality of articulating leg mechanisms 14 and the plurality of drive track assemblies 14' are adapted to propel apparatus 10 and apparatus 10', respectively. Adjacent segments 12, 12' are joined together via integrated joint actuator assembly 100 and a drive shaft 16. Preferably, drive shaft 16 is a two-degree degree of freedom universal joint. However, it should be appreciated that drive shaft joints having higher or lower degrees-of-freedom may be used.

Figure 4:
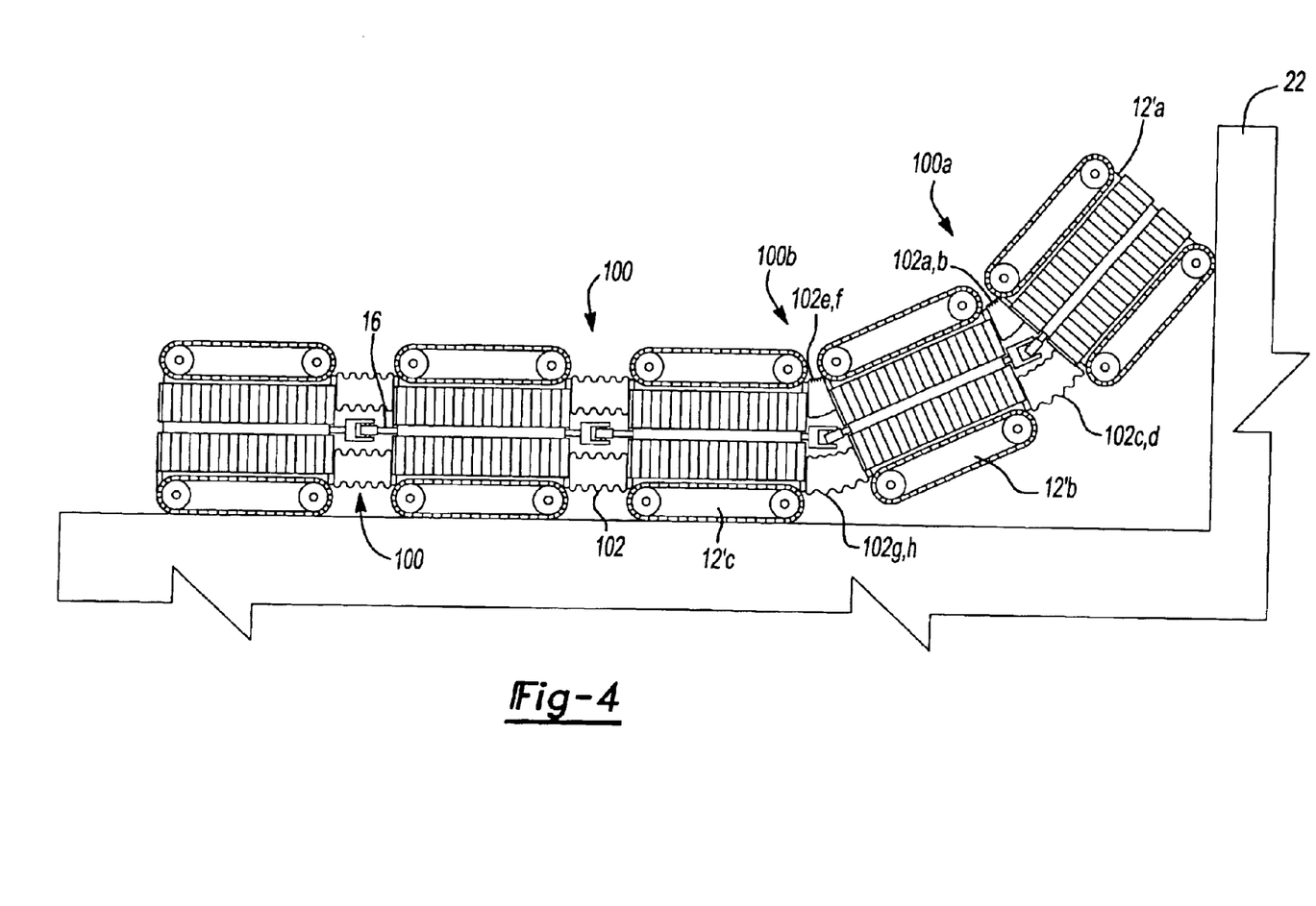
FIG. 4 is a schematic side view illustrating the integrated joint actuator assembly.
Figure 5:
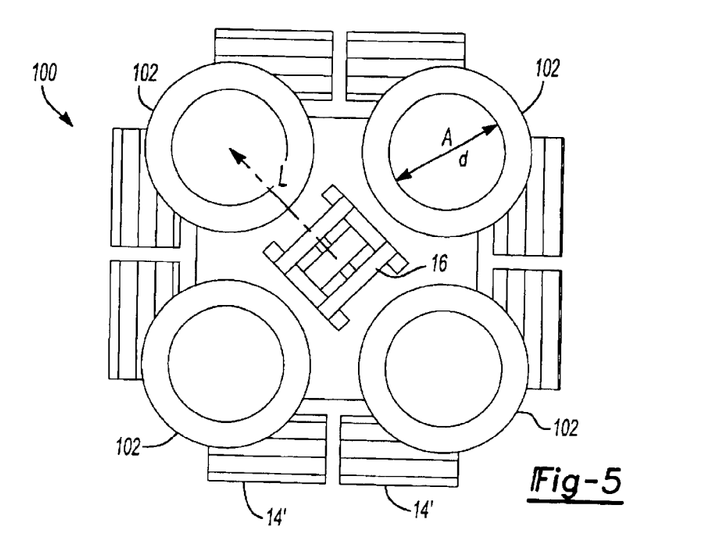
FIG. 5 is a cross-sectional view illustrating the bellows of the integrated joint actuator assembly.

As best seen in FIGS. 3–6, integrated joint actuator assembly 100 generally includes preferably four inflatable, pressure-resistant, flexible, hollow bodies, similar in function to pneumatic bellows and hereafter referred to as bellows 102. Each closed end of bellows 102 is coupled between adjacent segments 12, 12' along walls 104a and 104b via a fastner. Fluid communication is established with each bellows 102 to permit selective inflation and deflation of bellows 102 for proper control of integrated joint actuator assembly 100, which will be discussed below. It is preferred that bellows 102 are arranged in a general square-shaped orientation when viewed in cross-section (FIG. 5). However, it should be appreciated that any number of bellows may be used that provide adequate articulation control.

Figure 6:
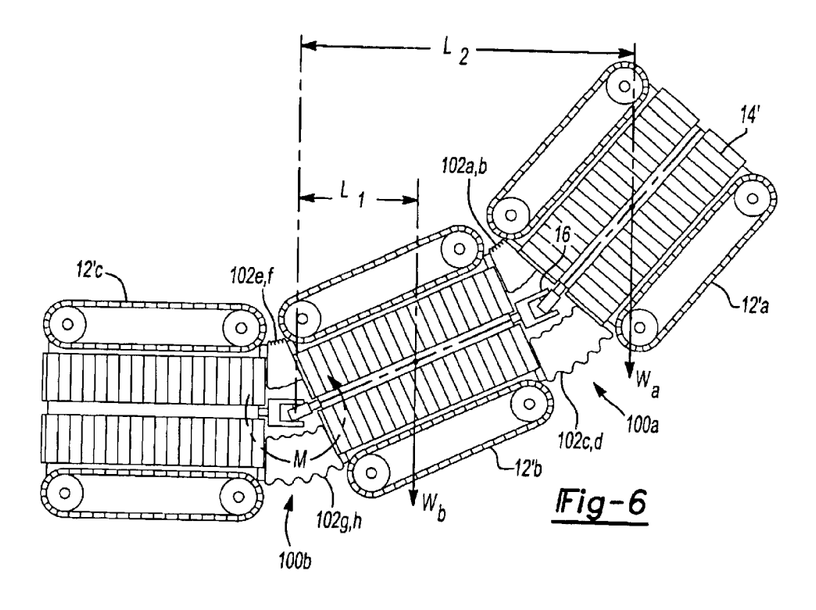
FIG. 6 is an enlarged schematic side view illustrating the integrated joint actuator assembly.

It is believed that a description of the operation of integrated joint actuator assembly 100 will facilitate an understanding of its construction and method of use. With particular reference to FIGS. 4 and 6, apparatus 10' is illustrated employing integrated joint actuator assembly 100. This arrangement is often useful for scaling or otherwise traversing a vertical obstacle 22. To this end, the lifting of the first two segments 12' (hereinafter referred to as 12'a and 12'b) relative to the remaining segments 12' (hereinafter referred collectively as 12'c) is often necessary. Segment 12'a and segment 12'b are interconnected via integrated joint actuator assembly 100a, which includes bellows 102a,b and bellows 102c,d. Likewise, segment 12'b and segment 12'c are interconnected via integrated joint actuator assembly 100b, which includes bellows 102e,f and bellows 102g,h. Segment 12'a has a weight generally indicated as Wa and segment 12'b has a weight generally indicated as Wb. In order to accomplish this task, integrated joint actuator assembly 100b inflated bellows 102g,h and exhausts bellows

102*e,f*. This creates a lifting moment M that must be sufficient to overcome the total reactive moment from the weight of each two segment 12'*a* and 12'*b* ($M_{react} = L_1 W_b + L_2 W_a$).

It should be understood that the apparatus of the present invention does not have a defined "up" or "down"; therefore it is intended to operate similarly from any orientation. Additionally, it may be rotated on one of its edges (as can be illustrated by rotating FIG. 5 45° or 135°). In such a case, only one single bellows would be necessary to contribute to the lifting moment M. In this case, the lever arm for producing this lifting moment would have length L, as shown in FIG. 5. The lifting moment produced by one bellows can be computed as:

$$M = LAP = L(\tfrac{1}{2}d)^2 \pi P \qquad (1)$$

where A is the cross sectional area of the bellows, P is the air pressure inside the bellows, and d is the diameter of the bellows.

It should be appreciated that for most serpentine robots, which are typically slender, the two geometric factors d and L are very limited. Therefore, as Eq. (1) suggests, the bellows' diameter d and the bellows' distance from the center L should be as large as possible to produce the largest lifting moment M needed to lift the two front segments 12'*a* and 12'*b*. Furthermore, since the lifting moment M is proportional to $d^2$, it is imperative that the diameter of the bellows be as large as possible.

In order to select a desired bellows, a number of pneumatic actuators have been considered, specifically cylinders, bellows, and so-called McKibben pneumatic muscles. It is known that cylinders and bellows develop force in quadratic proportion to their diameter d. However, pneumatic muscles develop force in relation to their diameter and length. Therefore, pneumatic muscles can produce an actuation force that is much larger than the force generated by a cylinder with the same diameter. However, a larger force requires greater length of the pneumatic muscle and the output force drops quickly as the pneumatic muscle contracts. The actuation force of bellows also drops with expansion, but not nearly as dramatically as that of McKibben pneumatic muscles.

As a result their inherent geometric characteristics, cylinders and McKibben pneumatic muscles would have to be placed within segments 12, 12' to actuate the joint therebetween. Accordingly, it is believed that the use of cylinders or McKibben pneumatic muscles would require excessive space within each segment 12, 12', thereby dramatically limiting the space available for the mechanical drive components, pneumatic valves, electronic components, and the like.

In contrast to cylinders and McKibben pneumatic muscles, the present invention provides an ideal solution to these space constraints as it employs a plurality of large-diameter pneumatic actuators, bellows 102, generally contained within the space between segments 102, thereby maximizing the space available of other components.

Figure 7:
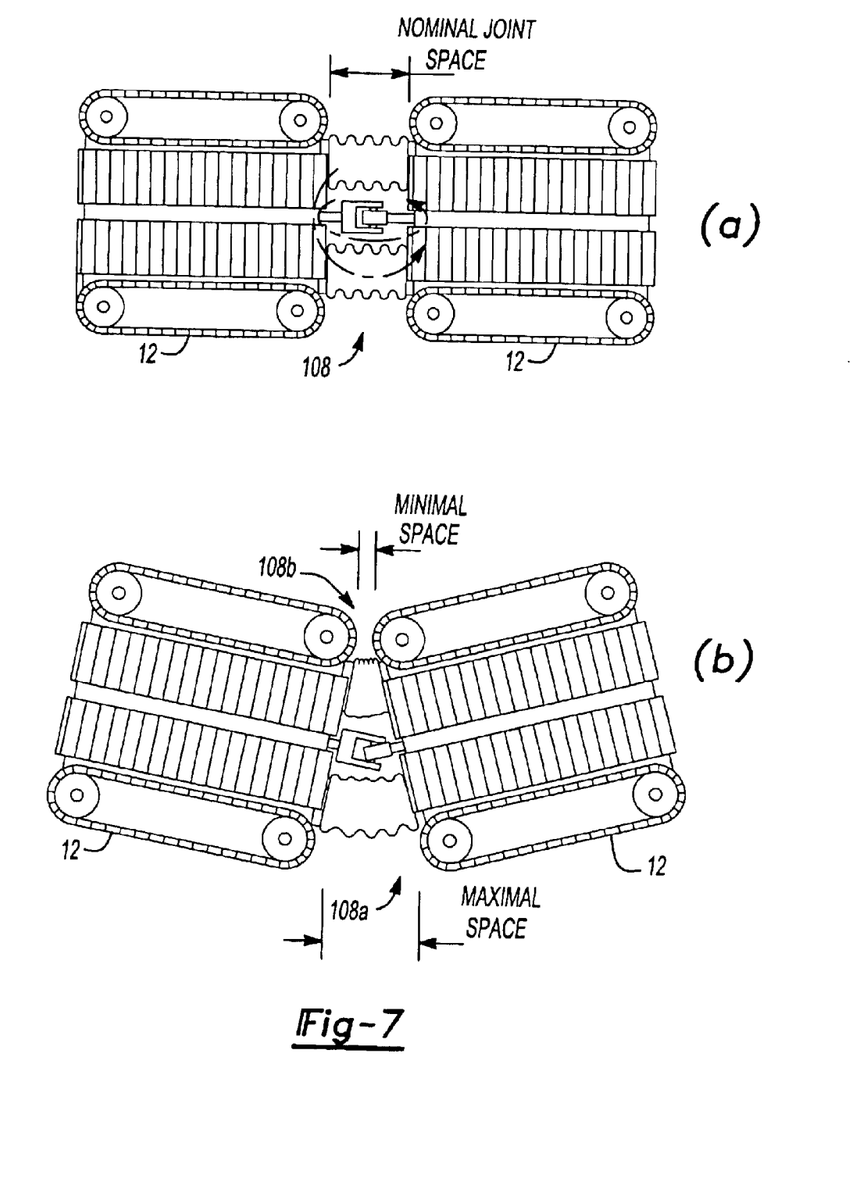

With particular reference to FIG. 7, it can be seen that in a flexed orientation (see FIG. 7(*b*)) there is very little room within the space between adjacent segments 12, 12' (hereinafter referred to as joint space 108). Additionally, as can be seen in FIGS. 7(*a*) and 7(*b*), this joint space 108 varies between a maximum space 108*a* and a minimum space 108*b* in response to joint angle. Because of these variations, the largest rigid component that can be mounted in joint space 108 has to be limited in size to fit into minimum space 108*b*. In practice, this means that a rigid actuator most likely cannot be used within joint space 108 due to the space requirements. In contrast to rigid components, bellows have the highly suitable property of taking up minimum space when deflated and maximum space when inflated. Therefore, the bellows may be placed in joint space 108 without taking up any space within segments 12, 12'.

The location of bellows 102 in joint space 108 permits larger actuator diameters than what would be possible if the actuators had to be placed within a segment. As will be recalled, because the maximal actuation force is proportional to the square of the actuator diameter ($d^2$) in bellows and cylinders, bellows-type actuators can produce a larger actuation force than cylinders. This comparison cannot be made with pneumatic muscles since the actuation force of pneumatic muscles is also dependent upon its length. However, as will be discussed, the stroke of pneumatic muscles is very limited.

Figure 8:
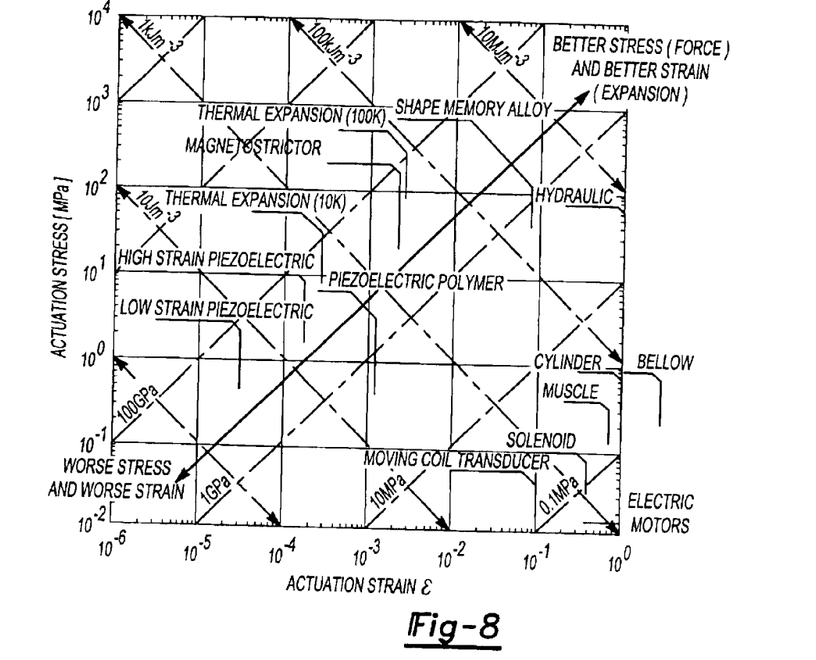
FIG. 8 is an actuation stress versus actuation strain curve.

In most cylinder-type actuators, actuation strain is limited to less than 1.0, because the piston and rod cannot move through a greater distance than one cylinder length. In pneumatic muscles, the actuation strain is about 0.3, and in pneumatic bellows, the actuation strain can reach 4.0. As is apparent from FIG. 8, bellows-type actuators have a slight advantage over cylinders and pneumatic muscles in terms of their actuation stress vs. actuation strain. This, together with the earlier discussed advantage of the placement of the bellows in joint space 108 allows for larger diameters and thus larger force, demonstrates that the present invention provides the best solution for force generation.

Although it is clear that pneumatic actuation, and especially bellows-type actuation is desirable over other methods, pneumatic systems require a source of compressed air, multiple valves, and control methods for those valves. The supply of compressed air is of particular concern for mobile robots—unless, of course, they are tethered. Truly autonomous, untethered robots have to produce their own compressed air from very limited on-board resources, thus increasing weight, requiring space, and consuming power.

Traditionally pneumatic systems are designed for so-called pick-and-place operations. In these applications, the actuator moves from one end of its stroke to the other. Compressed air consumption is limited to the amount of air used for performing the stroke. Once the actuator reaches its desired end-point, no additional air is being consumed. Such pick-and-place operation is too limited for the actuation of joints in serpentine robots.

More advanced methods, which allow the proportional control of pneumatic actuators, were introduced in recent years. Common to these proportional control methods is their continuing consumption of compressed air, both during motion and while remaining stationary. This is not a particular concern in conventional (i.e., industrial) pneumatic systems where there is usually a local source of compressed air that can provide an unlimited supply of compressed air at little cost. However, for mobile robots requiring pneumatic actuation, these proportional control methods are not suitable.

Another conventional method of implementing proportional control pneumatic is based on the use of servo valves. While pneumatic servo valves can be very precise, they also tend to be heavy and bulky. They are thus more suitable for stationary manipulators than for mobile robots. For smaller mobile robots, much lighter and compact on-off valves are a more applicable solution. Earlier solutions using on-off valves for implementing proportional control worked in a way that is similar to pulse width modulation (PWM) in electrical motors. That is, the valve rapidly moves between supplying and exhausting fluid. While rather good control is achieved this way, compressed air is continuously wasted even if the actuator is only holding but not moving.

A reduction in air consumption may be achieved using a four-valve configuration, as shown in FIGS. 9(a) and 9(b), which closes the chambers of cylinder-type actuators in steady state and thereby preserves compressed air. However, in this configuration the stiffness of the joints was not controlled. In serpentine robots and certain other applications, stiffness must be controlled at all times. For example, when multiple segments of a serpentine robot span a gap, very high stiffness must be maintained, whereas when traveling across rugged terrain, minimal stiffness (i.e. maximum compliance) must be maintained.

Figure 9:
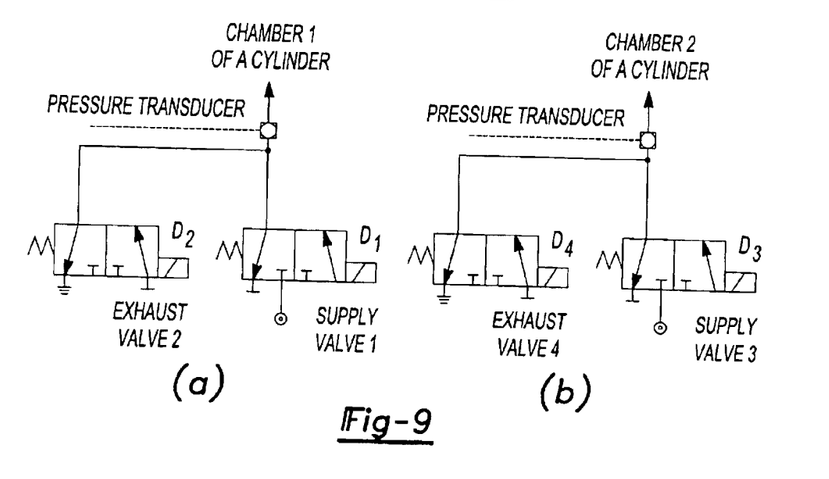
Figure 10:
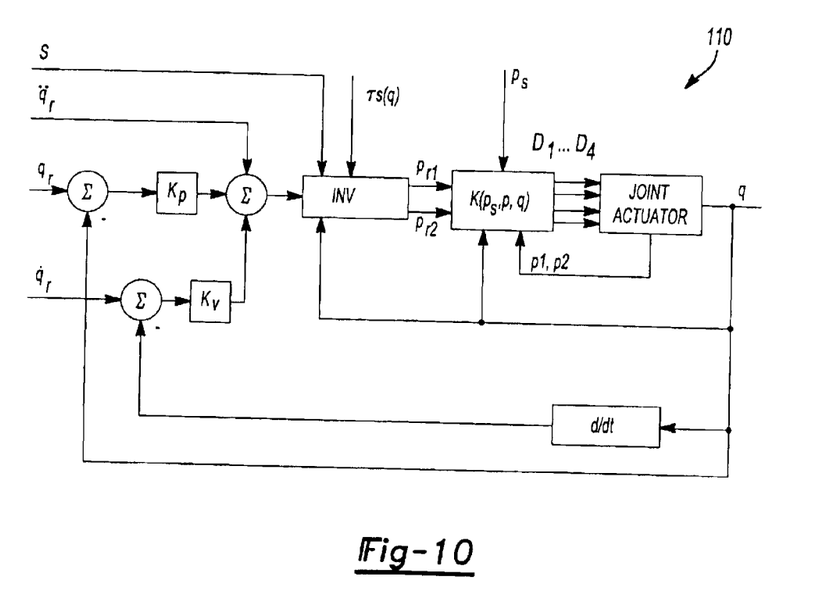
FIG. 10 is a block diagram illustrating the control system of the present invention.

In order to provide proportional position control and proportional stiffness control, as well as zero-airflow at steady state, a novel proportional control system is provided as illustrated in FIG. 10, generally referred to as proportional position and stiffness controller 110. Proportional position and stiffness controller 110 can be represented by the following relationships:

block INV contains:

$$I\ddot{q} = \tau_p - \tau_s - \tau$$
$$S = p_1 + p_2 \qquad (2)$$

where:
I—inertia,
q—joint's position,
$\tau_p = LA(p_1-p_2)$—pneumatic torque, L—force arm as shown in FIG. 5,
$P_1$, $p_2$—pressures in opposite bellows,
$\tau_s$—spring-like torque,
$\tau$—load torque,
A—bellows cross section area,
S—reference stiffness of the joint,
and block $K(p_s,p,q)$ contains:

$$D = G \frac{D_p}{A_s \sqrt{p_s - p}} \text{ if } G > 0 \qquad (3)$$

$$D = G \frac{-D_p}{A_e p} \text{ if } G < 0$$

where $D_p$ represents the period of the pulse width modulation controller and D represents the length of a pulse in the pulse width modulated controller. Four different signals $D_1$-$D_4$ control appropriate valves according to FIG. 9. D is always a fraction of $D_p$. Additionally, ep represents the pressure error and K represents the proportional coefficient. The coefficients As=68 and Ae=−72 were estimated using experimental data and a least square fit.

Figure 11:
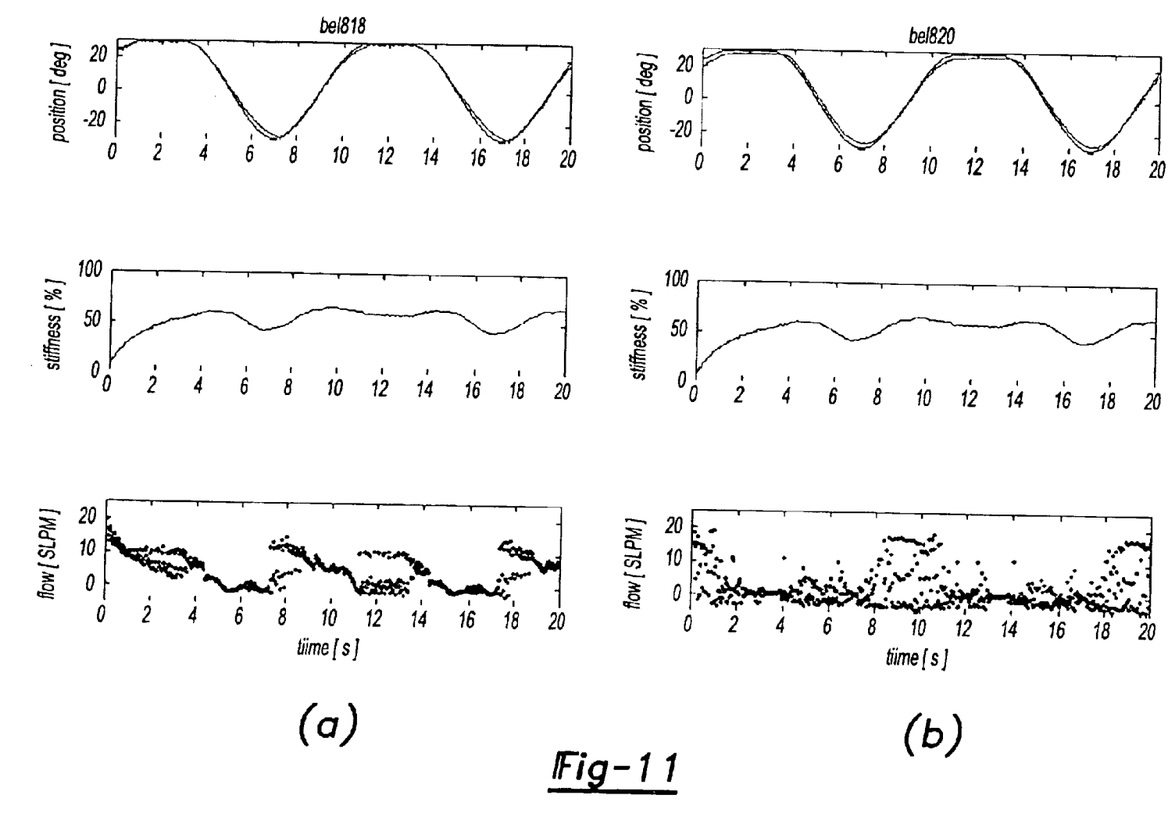

With particular reference to FIGS. 11(a) and 11(b), experimental results are illustrated in which a pair of pneumatic bellows is controlled using a conventional proportional pneumatic control system (FIG. 11(a)) and proportional position and stiffness controller 110 (FIG. 11(b)) to move a joint in a sinusoidal fashion, for two full periods. As can be seen in FIG. 11(a), the absence of stiffness control in the conventional proportional pneumatic control system causes the stiffness of the bellows to vary arbitrarily as a function of position. FIG. 11(b) illustrates how proportional position and stiffness controller 110 maintains a near-constant stiffness of 20% (as was commanded in this example). According to the present invention, stiffness may also be varied if desired throughout a full range of 0%–100% under computer control.

As can be seen from the lower air flowrate curve of FIGS. 11(a) and 11(b), the air consumption of the present invention is lower than that of the conventional proportional pneumatic control system as is shown by the concentration of flowrate data at a lower position on the flowrate graphs. In this particular example, proportional position and stiffness controller 110 of the present invention reduced airflow by a factor of two over the conventional proportional controller.

The description of the invention is merely exemplary in nature and, thus variations that do not depart from the gist of the invention are intended to be within the scope of the invention. Such variations are not to be regarded as a departure from the spirit and scope of the invention.

What is claimed is:

1. An apparatus comprising:
    a plurality of segments each having a first wall and a second wall;
    an integrated joint actuator assembly having a plurality of bellows-type actuators individually interconnecting at least a portion of said segments, each of said plurality of bellows-type actuators extending only between said first wall of a first of said plurality of segments and said second wall of a second of said plurality of segments;
    a plurality of drive mechanisms operably coupled to each of said plurality of segments, said plurality of drive mechanisms generally disposed about a periphery of each of said plurality of segments to provide traction at any position about said periphery;
    a power source; and
    a power transmission system interconnecting said power source and said plurality of drive mechanisms to drive said plurality of drive mechanisms.

2. The apparatus according to claim 1 wherein said plurality of drive mechanisms each comprises:
    a plurality of leg mechanisms operably coupled to each of said plurality of segments, said plurality of leg mechanisms generally disposed about a periphery of each of said plurality of segments to provide traction at any position about said periphery.

3. The apparatus according to claim 1 wherein each of said plurality of segments is identical and interchangeable.

4. The apparatus according to claim 1, further comprising:
    a head segment coupled to one of said plurality of segments; and
    a controller mounted in said head segment, said controller controlling said plurality of drive mechanisms and said integrated joint actuator assembly.

5. The apparatus according to claim 1 wherein each of said integrated joint actuator assembly includes at least one degree of freedom and each of said degrees of freedom through actuation of at least one of the plurality of bellows-type actuators.

6. The apparatus according to claim 1 wherein said plurality of drive mechanisms each comprises:
    a continuous drive track;
    a drive gear operably coupled to said power transmission system;
    a driven gear enmeshingly engaging said drive gear; and
    a track gear fixed for rotation with said driven gear, said track gear enmeshingly engaging said continuous drive track to drive said continuous drive track to propel the apparatus.

7. The apparatus according to claim 1 wherein a pair of said plurality of drive mechanisms is disposed on each of four sides of each of said plurality of segments to provide traction at any position about said periphery.

8. The apparatus according to claim 1 wherein said plurality of bellows-type actuators of said integrated joint actuator assembly are individually actuatable to permit movement of one of said plurality of segments relative to an adjacent segment.

9. The apparatus according to claim 8 further comprising:

a controller for individually controlling each of said plurality of bellows-type actuators, said controller capable of generally maintaining a predetermined position and predetermined stiffness, and minimizing airflow.

10. An apparatus comprising:

a plurality of segments;

an integrated joint actuator assembly having a plurality of bellows-type actuators individually interconnecting at least two of said segments;

a plurality of drive mechanisms operably coupled to each of said plurality of segments, said plurality of drive mechanisms generally disposed about a periphery of each of said plurality of segments to provide traction at any position about said periphery;

a power source;

a power transmission system interconnecting said power source and said plurality of drive mechanisms to drive said plurality of drive mechanisms; and a controller for individually actuating each of said plurality of bellows-type actuators, said controller operable to maintain a desired position and a desired stiffness in said plurality of bellows-type actuators.

11. The apparatus according to claim 10 wherein said plurality of drive mechanisms each comprises:

a plurality of leg mechanisms operably coupled to each of said plurality of segments, said plurality of leg mechanisms generally disposed about a periphery of each of said plurality of segments to provide traction at any position about said periphery.

12. The apparatus according to claim 10 wherein each of said plurality of segments is identical and interchangeable.

13. The apparatus according to claim 10, further comprising:

a head segment coupled to one of said plurality of segments; and a controller mounted in said head segment, said controller controlling said plurality of drive mechanisms and said integrated joint actuator assembly.

14. The apparatus according to claim 10 wherein each of said integrated joint actuator assembly includes at least one degree of freedom and each of said degrees of freedom through actuation of at least one of the plurality of bellows-type actuators.

15. The apparatus according to claim 10 wherein said plurality of drive mechanisms each comprises:

a continuous drive track;

a drive gear operably coupled to said power transmission system;

a driven gear enmeshingly engaging said drive gear; and a track gear fixed for rotation with said driven gear, said track gear enmeshingly engaging said continuous drive track to drive said continuous drive track to propel the apparatus.

16. The apparatus according to claim 10 wherein a pair of said plurality of drive mechanisms is disposed on each of four sides of each of said plurality of segments to provide traction at any position about said periphery.

* * * * *

UNITED STATES PATENT AND TRADEMARK OFFICE
CERTIFICATE OF CORRECTION

PATENT NO. : 6,870,343 B2
APPLICATION NO. : 10/672290
DATED : March 22, 2005
INVENTOR(S) : Johann Borenstein and Grzegorz Granosik It is certified that error appears in the above-identified patent and that said Letters Patent is hereby corrected as shown below:

Column 7, line 40

"
$$D = G \frac{D_p}{A_s \sqrt{p_s - p}} \quad if \quad G > 0$$

$$D = G \frac{-D_p}{A_e p} \quad if \quad G < 0$$
"

Should be

--
$$G = RkT\dot{m} = \dot{p}V + kp\dot{V} + K_p Ve_p + K_D V\dot{e}_p$$

$$D = G \frac{D_p}{A_s \sqrt{p_s - p}} \quad if \quad G > 0$$

$$D = G \frac{-D_p}{A_e p} \quad if \quad G < 0$$
--

Signed and Sealed this

Fifth Day of December, 2006

JON W. DUDAS
*Director of the United States Patent and Trademark Office*